US010026360B2

(12) United States Patent
Jung

(10) Patent No.: US 10,026,360 B2
(45) Date of Patent: Jul. 17, 2018

(54) TIMING CONTROLLER, DISPLAY PANEL, ORGANIC LIGHT EMITTING DISPLAY DEVICE, AND THE METHOD FOR DRIVING THE ORGANIC LIGHT EMITTING DISPLAY DEVICE

(71) Applicant: LG Display Co., Ltd., Seoul (KR)

(72) Inventor: Jaehoon Jung, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 20 days.

(21) Appl. No.: 14/983,856

(22) Filed: Dec. 30, 2015

(65) Prior Publication Data

US 2017/0092195 A1 Mar. 30, 2017

(30) Foreign Application Priority Data

Sep. 30, 2015 (KR) ........................ 10-2015-0137875

(51) Int. Cl.

| | |
|---|---|
| ***G09G 5/00*** | (2006.01) |
| ***G06F 3/038*** | (2013.01) |
| ***G09G 3/3258*** | (2016.01) |
| ***G09G 3/3266*** | (2016.01) |
| ***G09G 3/3275*** | (2016.01) |

(52) U.S. Cl.

CPC .......... *G09G 3/3258* (2013.01); *G09G 3/3266* (2013.01); *G09G 3/3275* (2013.01); *G09G 2310/08* (2013.01); *G09G 2320/0233* (2013.01); *G09G 2320/0257* (2013.01); *G09G 2320/041* (2013.01)

(58) Field of Classification Search

None

See application file for complete search history.

(56) References Cited

U.S. PATENT DOCUMENTS

2005/0134525 A1* 6/2005 Tanghe ................. G06F 3/1446 345/1.1
2007/0216635 A1* 9/2007 Kondoh ............... G09G 3/3629 345/101
2015/0348493 A1* 12/2015 Chae ........................ G09G 5/00 345/212
2016/0034988 A1* 2/2016 Howard ................ G06F 3/1446 348/143
2016/0196803 A1* 7/2016 Reynolds ................ G06F 3/044 345/174
2016/0209875 A1* 7/2016 Kim ...................... G06F 1/1652

* cited by examiner

*Primary Examiner* — Stephen T Reed
(74) *Attorney, Agent, or Firm* — Morgan, Lewis & Bockius LLP

(57) ABSTRACT

An organic light emitting display device includes a display panel including a plurality of sub-pixels, each sub-pixel having an organic light emitting diode and a driving transistor to drive the organic light emitting diode; a sensing circuit configured to output sensing data for feature values of the organic light emitting diode or the driving transistor of each sub-pixel; a humidity sensor configured to sense humidity at an edge of the display panel; and a controller configured to compare sense humidity sensed by the humidity sensor with a predetermined critical humidity, and control compensation for variance of the feature values using the sensing data or previously stored reference data, depending on a comparison result.

15 Claims, 19 Drawing Sheets

MOBILITY SENSING

Vsense WAVE

TIMING CONTROLLER, DISPLAY PANEL, ORGANIC LIGHT EMITTING DISPLAY DEVICE, AND THE METHOD FOR DRIVING THE ORGANIC LIGHT EMITTING DISPLAY DEVICE

CROSS REFERENCE TO RELATED APPLICATIONS

This application claims priority from and the benefit under 35 U.S.C. § 119(a) of Korean Patent Application Number 10-2015-0137875 filed on Sep. 30, 2015, which is hereby incorporated by reference for all purposes as if fully set forth herein.

BACKGROUND OF THE INVENTION

Field of the Invention

The present invention relates to a timing controller, a display panel, and an organic light emitting display device, and a driving method thereof.

Discussion of Related Art

Recently in the spotlight as a flat panel display device is an organic light emitting display device. Such a device adopts an organic light emitting diode that illuminates light by itself, and thus has advantages of a fast response time, high illumination efficiency, a wide illuminating and viewing angle, and the like.

In such organic light emitting display devices, sub-pixels including the organic light emitting diode are arranged in the form of a matrix, and brightness of each of the sub-pixels, selected based on a scan signal, is controlled depending on gradation of data.

Each sub-pixel includes circuit elements such as an organic light emitting diode and a driving transistor for driving the organic light emitting diode. The circuit elements included in each sub-pixel have characteristic feature values. For example, the driving transistor has a characteristic threshold voltage and a characteristic mobility. The organic light emitting diode has a characteristic threshold voltage.

The feature values of each circuit element may change due to deterioration, depending on a driving time. Further, changes in the feature values of each circuit element may be different from the changes in the feature values of circuit elements in other sub-pixels.

Such changes of the feature values of each circuit element and variation of the feature values between the circuit elements causes luminance variation between sub-pixels, which generates non-uniformity of the display panel's luminance. Thus, image quality can be decreased.

Therefore, compensation technologies for reducing variation of the feature value between the circuit elements by sensing the feature value or variation of the feature value of the circuit elements have been developed. However, there is a problem that the variation of the feature values of the circuit elements cannot be compensated due to imprecise sensing or false sensing of the feature values, or the variation of the feature values, of the circuit element.

For example, when humidity is increased over a predetermined level in the organic light emitting display device, a phenomenon exists that a signal line, an electrode, or the like, of a display panel may short circuit. In this case, a problem that the variation of the feature value of the circuit elements cannot be compensated due to imprecise or false sensing of the feature value, or the variation of the feature value, of the circuit element may occur, which causes an abnormal display phenomenon.

In an excessive case, a phenomenon of overcurrent in the display panel or a burnt display panel may appear.

SUMMARY OF THE INVENTION

Accordingly, embodiments of the present invention are directed to a timing controller, display panel, organic light emitting display device, and method for driving the organic light emitting display device that substantially obviate one or more of the problems due to limitations and disadvantages of the related art.

An object of the embodiments is to provide a timing controller, a display panel, an organic light emitting display device and a driving method thereof in which a display abnormal phenomenon such as a line defect due to humidity can be avoided.

Another object of the embodiments is to provide a timing controller, a display panel, an organic light emitting display device and a driving method thereof in which improper compensation caused by generation of a non-exact or false sensing data due to humidity can be avoided.

Still another object of the embodiments is to provide a timing controller, a display panel, an organic light emitting display device and a driving method thereof in which an overcurrent phenomenon or a burnt panel phenomenon due to humidity can be avoided.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an embodiment of the invention includes an organic light emitting display device including a display panel including a plurality of sub-pixels, each sub-pixel having an organic light emitting diode and a driving transistor to drive the organic light emitting diode; a sensing circuit configured to output sensing data for feature values of the organic light emitting diode or the driving transistor of each sub-pixel; a humidity sensor configured to sense humidity at an edge of the display panel; and a controller configured to compare sense humidity sensed by the humidity sensor with a predetermined critical humidity, and control compensation for variance of the feature values using the sensing data or previously stored reference data, depending on a comparison result.

According to another aspect, there is provided a method of driving an organic light emitting display device including a display panel including a plurality of sub-pixels, each sub-pixel having an organic light emitting diode and a driving transistor to drive the organic light emitting diode, the method including generating sensing data for feature values of the organic light emitting diode or the driving transistor of each sub-pixel; sensing humidity by a humidity sensor included in the display device; comparing sense humidity sensed by the humidity sensor with a predetermined critical humidity; and determining whether to use the sensing data in compensation for variance of the feature values depending on a result of the comparing.

According to still another aspect, there is provided a timing controller, including a sensing data receiving circuit configured to receive sensing data for feature values of an organic light emitting diode or a driving transistor for each of a plurality of sub-pixels; a comparator configured to compare sense humidity sensed by a humidity sensor with a predetermined critical humidity; and a compensation circuit configured to perform compensation for variance of the feature values using the sensing data or previously stored reference data, depending on a comparison result of the comparator.

According to still another aspect, there is provided a display panel including a plurality of data lines in a first direction; a plurality of gate lines in a second direction; a plurality of sub-pixels in the form of a matrix and defined by the intersections of the data lines and the gate lines; and a humidity sensor including a first sensor electrode, a dielectric, and a second sensor electrode, the humidity sensor in an edge area of the display panel, the humidity sensor configured to sense humidity based on resistance variation or capacitance variation between the first sensor electrode and the second sensor electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Figure 1:
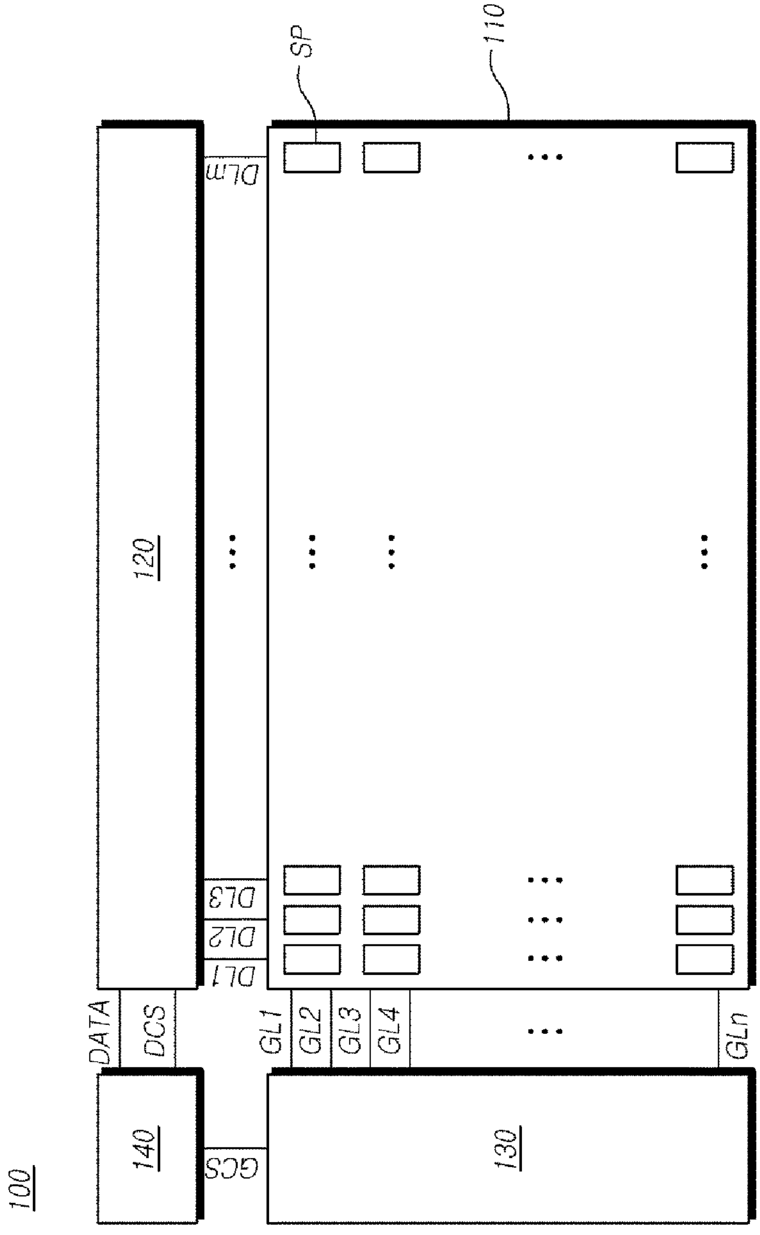
FIG. 1 is a diagram illustrating a schematic system configuration of an organic light emitting display device according to an example of the embodiments.

Reference will now be made in detail to the preferred embodiments of the present invention, examples of which are illustrated in the accompanying drawings. In describing the invention with reference to the accompanying drawings, like elements are referenced by like reference numerals or signs regardless of the drawing numbers. When it is determined that detailed description of known techniques involved in the invention makes the gist of the invention obscure, the detailed description thereof will not be made.

Terms such as first, second, A, B, (a), and (b) can be used to describe elements of the invention. These terms are merely used to distinguish one element from another element and the essence, order, sequence, number, or the like of the elements is not limited to the terms. If it is mentioned that an element is "coupled" or "connected" to another element, it should be understood that the element is directly coupled or connected to another element or still another element is "interposed" therebetween or the elements may be "coupled" or "connected" to each other with still another element interposed therebetween.

FIG. 1 is a diagram illustrating an example schematic system configuration of an organic light emitting display device 100 according to the embodiments. With reference to FIG. 1, the organic light emitting display device 100 includes a display panel 110 in which plural data lines DL1 to DLm, plural gate lines GL1 to GLn, and plural sub-pixels SP are arranged, a data driver 120 for driving the plural data line DL1 to DLm, a gate driver 130 for driving the plural gate lines GL1 to GLn, and a timing controller 140 for controlling the data driver 120 and the gate driver 130.

The timing controller 140 supplies various control signals to the data driver 120 and the gate driver 130 to control the data driver 120 and the gate driver 130. This timing controller 140 starts a scan in response to a timing implemented in each frame, switches an input image data inputted from an external device into a data signal format to be used in the data driver 120, outputs the switched image data, and controls data driving at suitable time in response to the scan.

The data driver 120 supplies data voltage to the plural data lines DL1 to DLm to drive the plural data lines DL1 to DLm. Here, the data driver 120 may be referred to as a source driver.

The gate driver 130 sequentially supplies scan signals to the plural gate lines GL1 to GLn to sequentially drive the gate lines GL1 to GLn. Here, the gate driver 130 may be referred to as a scan driver.

The gate driver 130 sequentially supplies scan signals of an ON voltage or an OFF voltage to the plural gate lines GL1 to GLn in response to control of the timing controller 140.

The data driver 120, when a specific gate line is opened by the gate driver 130, converts an image data received from the timing controller 140 into a data voltage having an analog form, and supplies the converted data voltage to the specific one of the plural data lines DL1 to DLm.

In the example of FIG. 1, the data driver 120 is arranged at only one side (for example, a top side or a bottom side) of the display panel 110, but the data driver 120 may be arranged at both sides (for example, a top side and a bottom side) of the display panel 110, depending on a driving type, a panel design type, and the like.

Also, in the example of FIG. 1, the gate driver 130 is arranged at only one side (for example, a left side or a right side) of the display panel 110, but the gate driver 130 may be arranged at both sides (for example, a left side and a right side) of the display panel 110, depending on a driving type, a panel design type, and the like.

The timing controller 140 receives an input image data and various timing signals including a vertical synchronizing signal Vsync, a horizontal synchronizing signal Hsync, an input data enable signal DE, a clock signal CLK, and the like from the external device (for example, a host system).

Besides switching the input image data inputted from the external device into the data signal format to be used in the data driver 120 and outputting the switched image data, the timing controller 140 receives timing signals such as the vertical synchronizing signal Vsync, the horizontal synchronizing signal Hsync, the input data enable signal DE, and the clock signal CLK, generates various control signals, and then outputs the generation signals to the data driver 120 and the gate driver 130 to control the data driver 120 and the gate driver 130.

For example, the timing controller 140 outputs various control signals GCS, including a gate start pulse GSP, a gate shift clock GSC, a gate output enable signal GOE, and the like, in order to control the gate driver 130.

Here, the gate start pulse GSP controls an operation start timing of one or more gate driver integrated circuits constituting the gate driver 130. The gate shift clock GSC is a clock signal to be commonly input to one or more gate driver integrated circuit, and controls a shift timing of a scan signal (a gate pulse). The gate output enable signal GOE designates timing information of one or more gate driver integrated circuits.

Further, the timing controller 140 outputs various data control signals DCS, including a source start pulse SSP, a source sampling clock SSC, a source output enable SOE, and the like, in order to control the data driver 120.

Here, the source start pulse SSP controls a data sampling start timing of one or more source driver integrated circuits constituting the data driver 120. The source sampling clock SSC is a clock signal for controlling a data sampling timing of each source driver integrated circuit. The source output enable signal SOE controls an output timing of the data driver 120.

The data driver 120 drives at least one source driver integrated circuit SDIC and plural data lines.

Each source driver integrated circuit SDIC includes a shift register, a latch circuit, a digital to analog converter, an output buffer, and the like. In some cases, each source driver integrated circuit SDIC further includes an analog to digital converter.

The gate driver 130 includes at least one gate driver integrated circuit GDIC. Each gate driver integrated circuit GDIC includes a shift register, a level shifter, and the like.

Each sub-pixel arranged in the display panel 110 includes a circuit element such as a transistor. For example, each sub-pixel is configured by an organic light emitting diode and a driving transistor for driving the organic light emitting diode.

Types and numbers of circuit elements constituting each sub-pixel are differently determined depending on a supplying function, a design method, and the like.

Figure 2:
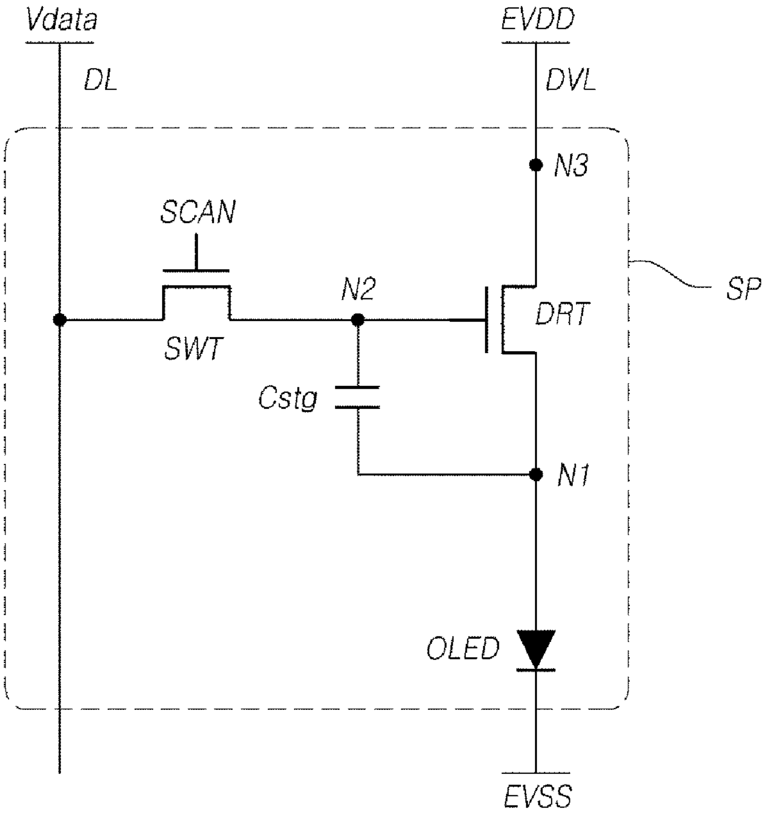
FIG. 2 is an example view illustrating a configuration of a sub-pixel of the organic light emitting display device according to an example of the embodiments.

FIG. 2 is an example view illustrating a configuration of a sub-pixel of the organic light emitting display device 100 according to the embodiments. With reference to FIG. 2, in the organic light emitting display device 100 according to an example of the embodiments, each sub-pixel is configured to include an organic light emitting diode OLED, a driving transistor DRT for driving the organic light emitting diode, a switching transistor SWT for supplying a data voltage to a second node N2 corresponding to a gate node of the driving transistor DRT, and a storage capacitor Cstg for maintaining a data voltage corresponding to an image signal voltage or a voltage corresponding thereto for one frame time.

The organic light emitting diode OLED comprises a first electrode (for example, an anode electrode or a cathode electrode), a dielectric layer, a second electrode (for example, a cathode electrode or an anode electrode), and the like.

The driving transistor DRT supplies a driving current to the organic light emitting diode OLED to drive the organic light emitting diode OLED.

A first node N1 of the driving transistor DRT is electrically connected to a first electrode of the organic light emitting diode OLED, and is a source node or a drain node. A second node N2 of the driving transistor DRT is electrically connected to a source node or a drain node of the switching transistor SWT, and is a gate node. A third node N3 of the driving transistor DRT is electrically to a driving voltage line DVL for supplying a driving voltage EVDD, and is a drain node or a source node.

As illustrated in the example of FIG. 2, the driving transistor DRT and the switching transistor SWT are implemented by using an n-type, but may be implemented by using a p-type.

The switching transistor SWT is electrically connected between the data line DL and the second node N2 of the driving transistor DRT, and is controlled by receiving the scan signal SCAN in the gate node through the gate line.

This switching transistor SWT is turned on in response to the scan signal SCAN and transfers a data voltage Vdata supplied from the data line DL to the second node N2 of the driving transistor DRT.

The storage capacitor Cstg is electrically connected between the first node N1 and the second node N2 of the driving transistor DRT.

This storage capacitor Cstg is not a parasitic capacitor, that is, an internal capacitance existing between the first node N1 and the second node N2 of the driving transistor DRT, but an external capacitor intentionally designed in the outside of the driving transistor DRT.

Meanwhile, in the organic light emitting display device 100 according to the embodiments, driving time of each sub-pixel SP is lengthened, which causes degradation of the circuit elements of the organic light emitting diode OLED, the driving transistor DRT, and the like.

As a result, specific feature values (for example, a threshold voltage, a mobility, and the like) of the circuit elements such as the organic light emitting diode OLED and the driving transistor DRT can change.

This change of the feature values of the circuit elements may cause luminance variance of the corresponding sub-pixel. Accordingly, the change of the feature values of the circuit elements may be conceptually the same as luminance variance of the sub-pixel.

Further, levels of the changes of the feature values between circuit elements are different from each other, depending on a degradation state of each circuit element.

This deviation of feature values between circuit elements causes luminance deviation. Therefore, the deviation of feature values between circuit elements may be conceptually the same as luminance deviation between the sub-pixels.

The luminance variance of the sub-pixel and the luminance deviation between the sub-pixels cause a problem of a decrease in precision (e.g., exact) luminance expression capability of the sub-pixel, a display abnormal phenomenon, or the like.

Here, the features value of the circuit element (hereinafter, referred to as "feature values of the sub-pixel") includes, for example, a threshold voltage, mobility, and the like of the driving transistor DRT, and may include a threshold voltage of the organic light emitting diode OLED.

The organic light emitting display device 100 according to an example of the embodiments senses a luminance variance of the sub-pixel and a luminance deviation between the sub-pixels (a luminance variance of the circuit element and a luminance deviation between the circuit elements), and compensates a luminance variance of the sub-pixel and a luminance deviation between the sub-pixels by using the sensed result.

The organic light emitting display device 100 according to an example of the embodiments includes a compensation circuit including a sub-pixel configuration and a sensing and compensation configuration suitable for supplying a sensing and compensation function for a luminance variance of the sub-pixel and a luminance deviation between the sub-pixels.

Figure 3:
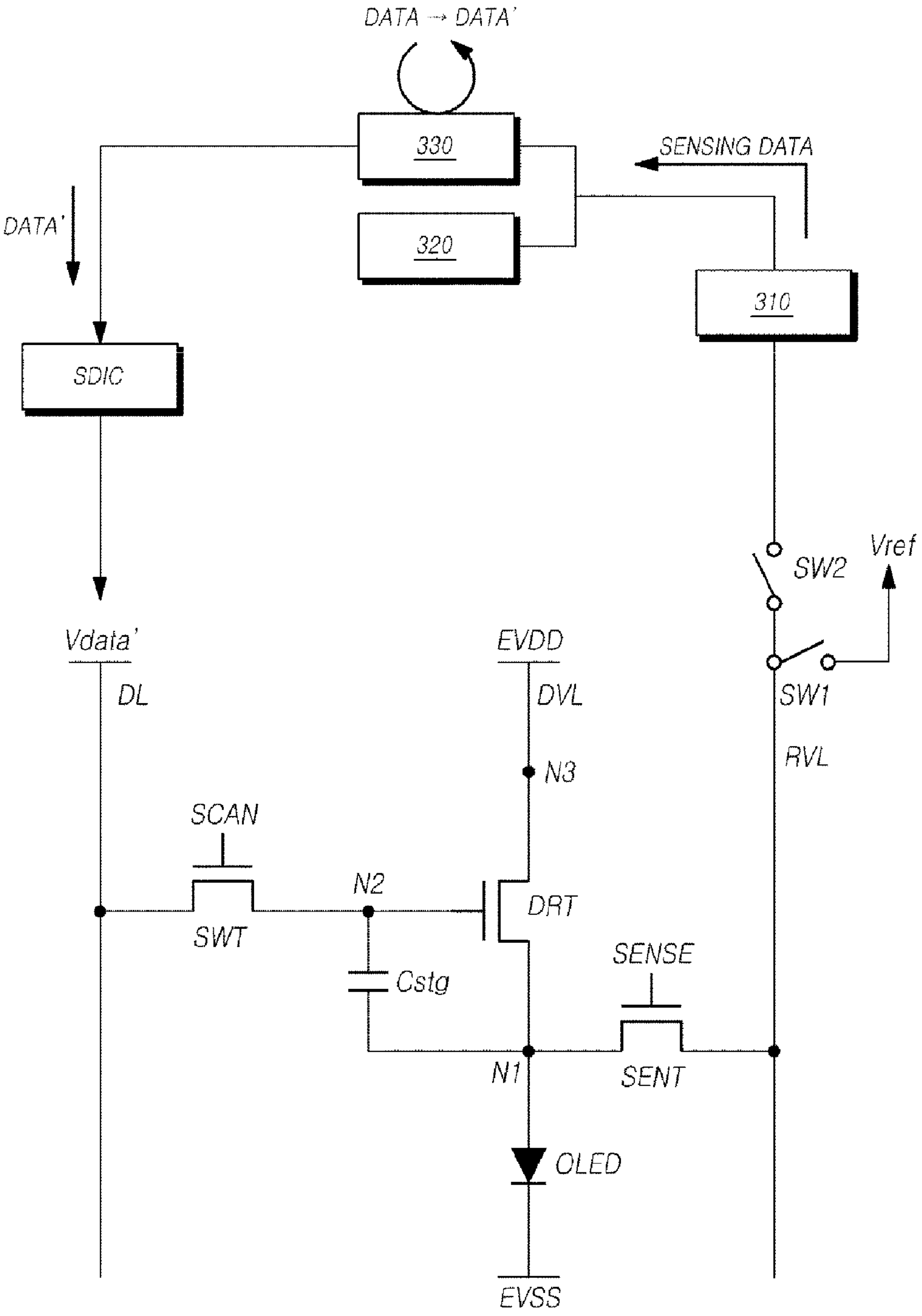
FIG. 3 is an example view illustrating a compensation circuit of the organic light emitting display device according to an example of the embodiments.

FIG. 3 is an example view illustrating a compensation circuit of the organic light emitting display device 100 according to the embodiments. With reference to FIG. 3, each sub-pixel arranged in the display panel 110 further includes, for example, a sensing transistor SENT for sensing, compensating, and the like functions except for the organic light emitting diode OLED, the driving transistor DRT, the switching transistor SWT, the storage capacitor Cstg.

With reference to FIG. 3, the sensing transistor SENT is electrically connected between the first node N1 of the driving transistor DRT and a reference voltage line RVL for supplying a reference voltage Vref, and is controlled by receiving a sensing signal SENSE of a kind of a scan signal through a gate node.

This sensing transistor SENT is turned on in response to the sensing signal SENSE, and applies the reference voltage Vref supplied through the reference voltage line RVL to the first node N1 of the driving transistor DRT.

Further, the sensing transistor SENT is utilized as a voltage sensing path for the first node N1 of the driving transistor DRT.

Meanwhile, the scan signal SCAN and the sensing signal SENSE may be gate signals that are different from each other. In this case, the scan signal SCAN and the sensing signal SENSE may be applied to a gate node of the switching transistor SWT and a gate node of the sensing transistor SENT, respectively.

In some cases, the scan signal SCAN and the sensing signal SENSE may be the same gate signals. In this case, the scan signal SCAN and the sensing signal SENSE may be applied to a gate node of the switching transistor SWT and a gate node of the sensing transistor SENT via the same gate line.

With reference to FIG. 3, the organic light emitting display device 100 according to an example of the embodiments includes a sensing unit (circuit) 310 that outputs sensing data by sensing a variance of a feature value of the sub-pixel (e.g., a feature value of the driving transistor, a feature value of the organic light emitting diode) and/or a deviation of feature values between the sub-pixels, a memory 320 that stores the sensing data, and a compensation unit 330 that performs a compensation process for compensating the variance of the feature values of the sub-pixel and/or the deviation of the feature values between the sub-pixels by using the sensing data.

The sensing unit 310 is configured to include at least one analog to digital converter ADC. Each analog to digital converter ADC is may be included inside the source driver integrated circuit SDIC, or may be located outside the source driver integrated circuit SDIC.

The compensation unit 330 may be included inside the timing controller 140, or may be located outside the timing controller 140.

The sensing data outputted from the sensing unit 310 is a data format of, e.g., low voltage differential signaling LVDS.

The organic light emitting display device 100 according to an example of the embodiments further includes a first switch SW1 and a second switch SW2 for controlling a sensing driving, that is, for controlling a voltage applying state of the first node N1 of the driving transistor DRT of the sub-pixel to be at a state necessary for sensing feature values of the sub-pixel.

Whether the reference voltage Vref is supplied to the reference voltage line RVL or not is controlled by the first switch SW1.

When the first switch SW1 is turned on, the reference voltage Vref is supplied to the reference voltage line RVL and applied to the first node N1 of the driving transistor DRT via the sensing transistor SENT which is turned on.

Meanwhile, when a voltage of the first node N1 of the driving transistor DRT becomes a voltage reflecting the feature values of the sub-pixel, a voltage of the reference voltage line, which is a potential equal to the first node N1 of the driving transistor DRT, becomes the voltage reflecting the feature values of the sub-pixel. At this time, a line capacitor formed in the reference voltage line RVL is charged by the voltage reflecting the feature values of the sub-pixel.

When the voltage of the first node N1 of the driving transistor DRT becomes the voltage reflecting the feature values of the sub-pixel, the second switch SW2 is turned on, and thus, the sensing unit 310 is connected to the reference voltage line RVL.

As a result, the sensing unit 310 senses a voltage of the reference voltage line RVL that reflects the feature values of the sub-pixel, that is, a voltage of the first node N1 of the driving transistor DRT. Here, the reference voltage line RVL is also described as a sensing line.

With regard to the reference voltage line RVL, for example, one RVL may be arranged in every column of the sub-pixel, or in every two or more columns of the sub-pixels.

For example, when one pixel comprises four sub-pixels (a red sub-pixel, a white sub-pixel, a green sub-pixel, and a blue sub-pixel), one reference voltage line RVL may be arranged in every one pixel column including four sub-pixel columns (a red sub-pixel column, a white sub-pixel column, a green sub-pixel column, and a blue sub-pixel column).

When connected to the reference voltage line RVL, the sensing unit 310 senses a voltage (a voltage of the reference voltage line RVL or a voltage charged in a line capacitor of the reference voltage line RVL) of the first node N1 of the driving transistor DRT.

The voltage sensed in the sensing unit 310 may be a voltage value (Vdata−Vth or Vdata−ΔVth) including a threshold voltage Vth or a threshold voltage deviation ΔVth of the driving transistor DRT, or a voltage value for sensing a mobility of the driving transistor DRT.

Hereinafter, a threshold voltage sensing driving and a mobility sensing driving for the driving transistor DRT will be described.

Figure 4:
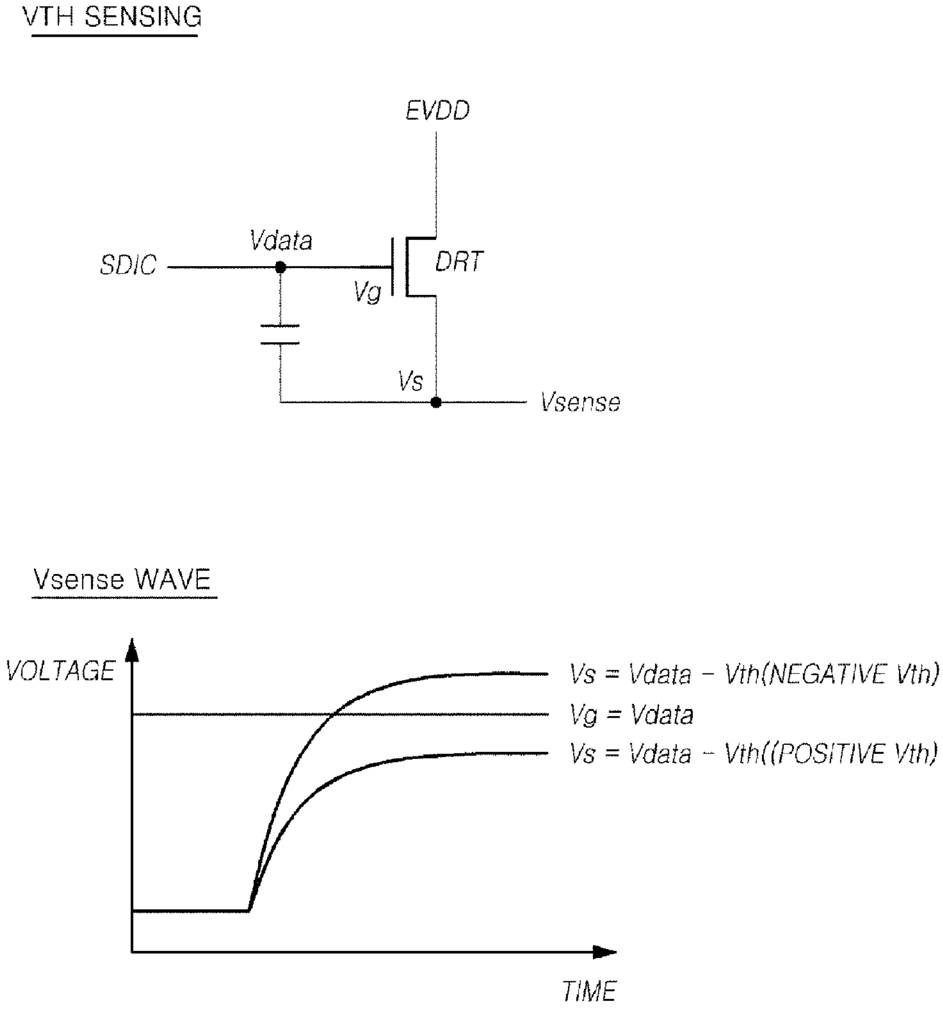
FIG. 4 is a diagram explaining a driving method of sensing a threshold voltage of the organic light emitting display device according to an example of the embodiments.

FIG. 4 is a diagram explaining a driving method of sensing a threshold voltage of the organic light emitting display device 100 according to an example of the embodiments.

In the threshold voltage sensing driving for the driving transistor DRT, each of the first node N1 and the second node N2 of the driving transistor DRT is initialized as a reference voltage Vref and a data voltage Vdata for the threshold voltage sensing driving, respectively.

Then, when the first node N1 of the driving transistor DRT becomes a floating state, a voltage of the first node N1 of the driving transistor DRT rises. As the voltage rises for a certain time, the rising of the voltage of the first node N1 of the driving transistor DRT gradually lessens and reaches saturation.

A saturated voltage of the first node N1 of the driving transistor DRT corresponds to the difference between the data voltage Vdata and the threshold voltage Vth, or the difference between the data voltage Vdata and the threshold voltage deviation ΔVth.

When the voltage of the first node N1 of the driving transistor DRT is saturated, the sensing unit 310 senses the saturated voltage of the first node N1 of the driving transistor DRT.

A voltage Vsense sensed by the sensing unit 310 is a voltage Vdata-Vth obtained by subtracting the threshold voltage Vth from the data voltage Vdata, or a voltage Vdata−ΔVth obtained by subtracting the threshold voltage deviation ΔVth from the data voltage Vdata.

Figure 5:
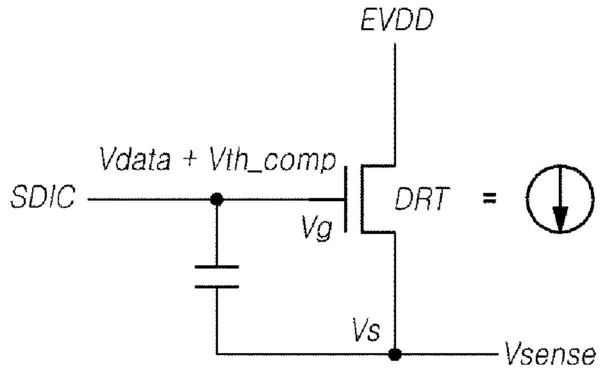
FIG. 5 is a diagram explaining a mobility sensing driving method of the organic light emitting display device according to an example of the embodiments.
Figure 5:
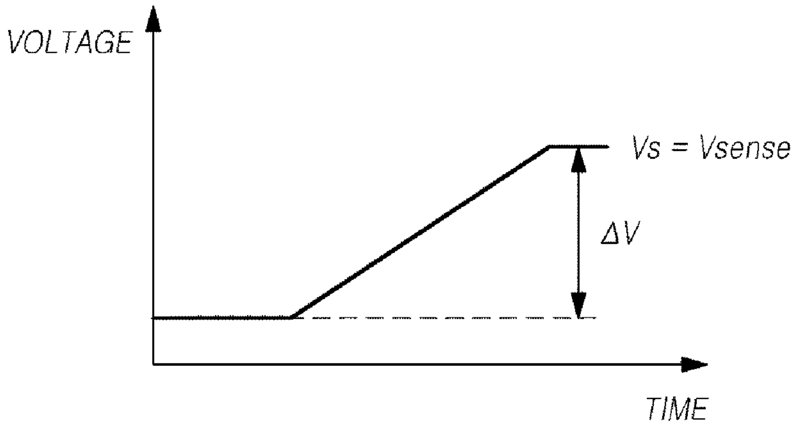

FIG. 5 is a diagram explaining a mobility sensing driving method of the organic light emitting display device according to an example of the embodiments.

With reference to FIG. 5, when a mobility sensing is driven, the first node N1 and the second node N2 of the driving transistor DRT are initialized as the reference voltage Vref and a mobility sensing driving data voltage Vdata+Vth_comp, respectively.

Here, on the assumption that a threshold voltage is compensated before the mobility sensing driving, the mobility sensing driving data voltage Vdata+Vth_comp additionally includes a voltage Vth_comp corresponding to a threshold voltage compensation.

Then, the first node N1 of the driving transistor DRT becomes a floating state, and thus, a voltage of the first node N1 of the driving transistor DRT can rise.

In this time, a voltage rising speed (variation ΔV of a voltage rise to time) represents a current capability of the driving transistor, that is, mobility. Therefore, as a driving transistor DRT has higher current capability (mobility), a voltage of the first node N1 of the driving transistor DRT rises more steeply.

After a voltage rises for a predetermined time, the sensing unit 310 senses a voltage Vsense of the reference voltage line RVL of which a voltage rises together with a rise of a voltage of the first node N1 of the driving transistor DRT.

With reference to FIG. 3, according as threshold voltage or mobility sensing driving are performed as described above, the sensing unit 310 converts a voltage Vsense sensed by sensing the threshold voltage or the mobility into a digital value, generates sensing data including the digital value, and outputs the generated sensing data. The sensing data outputted from the sensing unit 310 is stored in a memory 320, or is supplied to the compensation unit 330.

Based on the sensing data stored in the memory 320 or supplied from the sensing unit 310, the compensation unit 330 figures out feature values (e.g., a threshold voltage and mobility) of a driving transistor DRT or variations of the feature values (e.g., a variation of the threshold voltage and a variation of the mobility) of the driving transistor DRT in the sub-pixel corresponding to the sensing data, and performs a feature value compensation process.

Here, the variation of the feature values of the driving transistor DRT represents that a current sensing data is changed on the basis of a prior sensing data, or represents that the current sensing data is changed on the basis of a reference sensing data.

By comparing feature values or variation of the feature values between driving transistors DRT, a deviation of the feature values between the driving transistors DRT is determined. When the variation of the feature values of the driving transistor DRT represents that the current sensing data is changed on the basis of a reference sensing data, a deviation of the feature values, that is, (a luminance deviation of the sub-pixels) between the driving transistors DRT is determined based on the variation of the feature values of the driving transistor DRT.

A compensation process for a feature value includes a threshold voltage compensation process for compensating a threshold voltage of the driving transistor DRT and a mobility compensation process for compensating mobility of the driving transistor DRT.

The threshold voltage compensation process includes a process of calculating a compensation value for compensating a threshold voltage or a deviation of the threshold voltage (a threshold voltage variation), a process of storing the calculated compensation value in the memory 320, or a process of changing the corresponding image data by using the calculated compensation value (Data→Data').

The mobility compensation process includes a process of calculating a compensation value for compensating mobility or a deviation of the mobility (a variation of the mobility), a process of storing the calculated compensation value in the memory 320, or a process of changing the corresponding image data by using the calculated compensation value (Data→Data').

The compensation unit 330 changes the image data Data by performing the threshold voltage compensation process or the mobility compensation process, and supplies the changed data to the corresponding source driver integrated circuit SDIC in the data driver 120.

As a result, the source driver integrated circuit SDIC converts the changed data Data' into a data voltage Vdata' and supplies the converted data voltage to the corresponding sub-pixel, and thus, a compensation for the feature values of the sub-pixel (a threshold voltage compensation, a mobility compensation) is actually performed.

Due to such compensation for the feature values of the sub-pixel, luminance deviation between sub-pixels is lessened or prevented, and thus, image quality can be improved.

Figure 6:
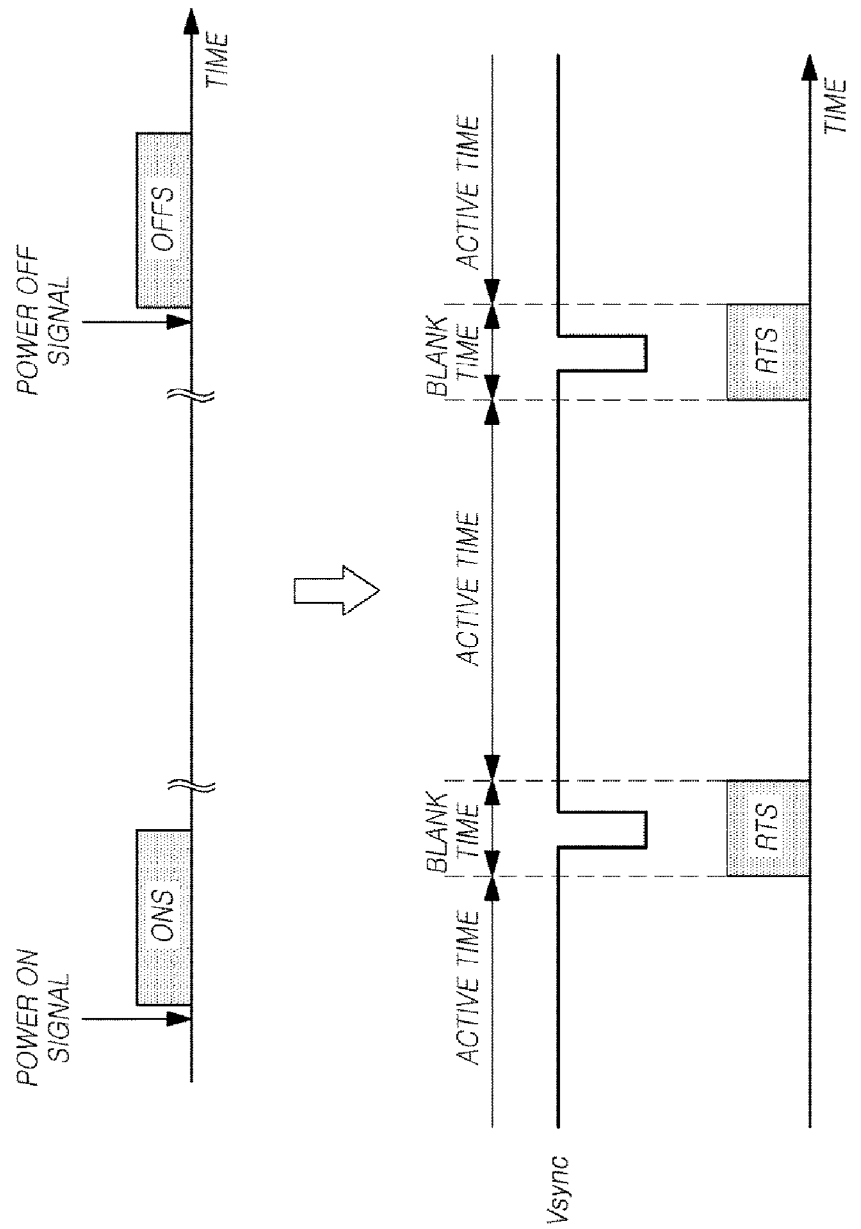
FIG. 6 is a diagram illustrating various sensing periods of the organic light emitting display device according to an example of the embodiments.

FIG. 6 is a diagram illustrating various sensing periods of the organic light emitting display device 100 according to an example of the embodiments. With reference to FIG. 6, the organic light emitting display device 100 performs a sensing operation during an On-sensing period ONS after generation of a Power On signal.

Further, the organic light emitting display device 100 performs a sensing operation during an Off-sensing period OFFS after generation of a Power Off signal. Also, the organic light emitting display device 100 performs a sensing operation every real time sensing period RTS existing in an image driving.

More specifically, on the basis of a vertical synchronizing signal Vsync, a blank time BlankTime defined between active times ActiveTime corresponding to an image driving time is allotted to the real time sensing period RTS, and a sensing operation is performed every RTS.

Meanwhile, a sensing operation for a threshold voltage of one sub-pixel takes a longer time relative to a sensing operation for mobility of one sub-pixel.

Therefore, for example, the sensing operation of the threshold voltage is performed in the Off sensing period OFFS, and the sensing operation for the mobility is performed in every On sensing period ONS and real time sensing period RTS.

Meanwhile, the organic light emitting display device 100 according to an example of the embodiments may exist in a high humidity circumstance.

When humidity that neighbors the organic light emitting display device 100 becomes abnormal, caused by a humidity increase over a predetermined level, short circuits or variations in electrical characteristics may occur in various signal lines, various circuit elements, and the like of the display panel 110.

In this case, a voltage sensed by the sensing unit 310 may become an abnormally high voltage or an abnormally low voltage, and thus, the sensing data output from the sensing unit 310 has a non-exact value. As a result, an abnormal phenomenon appears on a display due to a false compensation process.

For example, when non-exact sensing data is obtained because a noise component, caused by humidity, is included in a sensing data for a sub-pixel connected to a reference voltage line RVL, a false image driving is performed in the sub-pixel connected to the reference voltage line RVL. A display abnormality phenomenon appears in the direction of the reference voltage line RVL, which is referred to as a line defect in the display.

In a case that the above-mentioned phenomenon caused by an abnormal humidity phenomenon seriously appears, overcurrent may flow in the display panel 110, or the display panel 110 may be burned.

In this regard, embodiments provide a method and a system in which an abnormal humidity circumstance is sensed and a suitable response thereto is provided.

Hereinafter, an abnormal humidity circumstance sensing and responding system will be described.

Figure 7:
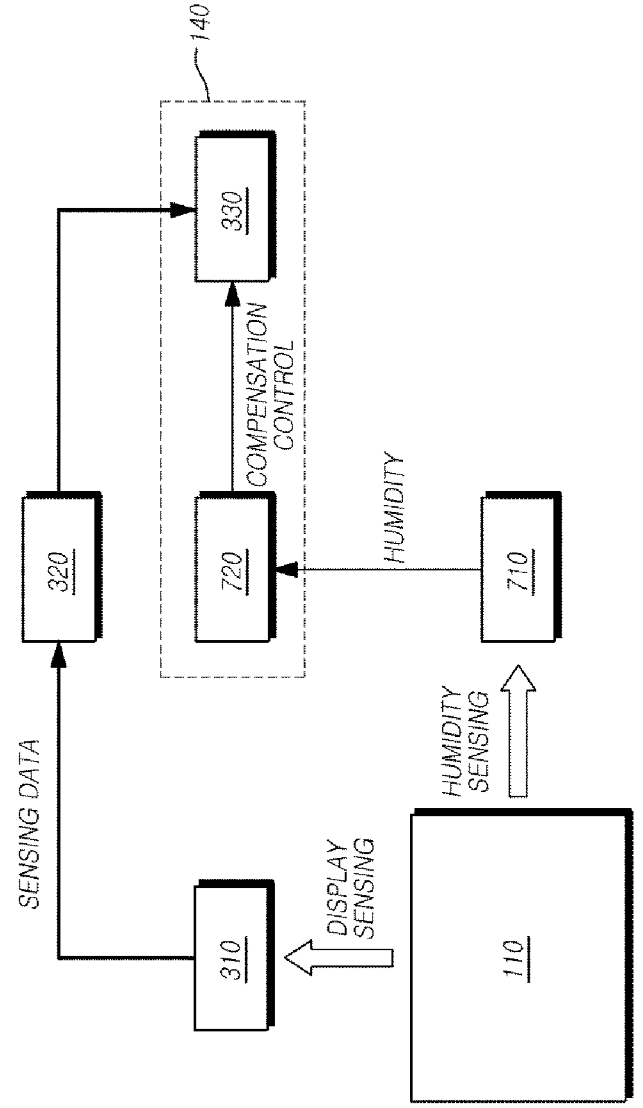
FIG. 7 is a diagram illustrating an abnormal humidity circumstance sensing and responding system of the organic light emitting display device according to an example of the embodiments.
Figure 8:
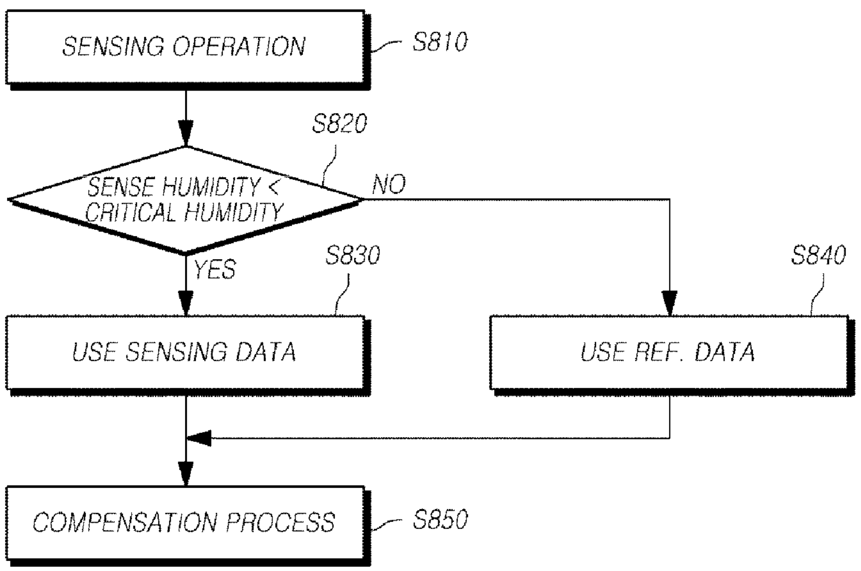
FIG. 8 is a flow chart of an abnormal humidity circumstance sensing and responding method of the organic light emitting display device according to an example of the embodiments.

FIG. 7 is a diagram illustrating an abnormal humidity circumstance sensing and responding system of the organic light emitting display device 100 according to an example of the embodiments, and FIG. 8 is a flow chart of an abnormal humidity circumstance sensing and responding method of the organic light emitting display device 100 according to an example of the embodiments.

With reference to FIG. 7, as described above, the organic light emitting display device 100 includes a display panel 110 in which plural sub-pixels SP including an organic light emitting diode OLED and a driving transistor DRT for driving the organic light emitting diode OLED are arranged, a sensing unit 310 which outputs sensing data for feature values of the organic light emitting diode OLED or the driving transistor DRT of each sub-pixel SP, a memory 320 which stores the sensing data output from the sensing unit 310, and a compensation unit 330 which performs a compensation process by using the sensing data or reference data.

With reference to FIG. 7, a system, which senses an abnormal humidity circumstance in the organic light emitting display device 100 and responds to sensing the abnormal humidity circumstance, includes a humidity sensor 710 that senses neighboring humidity (e.g., humidity at an edge of the display panel), and a controller 720 that, on the basis of a comparison result obtained by comparing sense humidity sensed by the humidity sensor 710 with predetermined critical humidity, controls execution of a compensation process by using sensing data, or controls execution of a compensation process by using previously stored reference data.

The above-mentioned critical humidity is previously set information and is reference humidity for an abnormal humidity phenomenon which causes a display abnormality phenomenon, a burnt panel phenomenon, an overcurrent phenomenon, or the like.

In accordance with the above discussion, a display abnormality phenomenon caused by an abnormal humidity circumstance can be previously prevented by performing a normal compensation after determining whether to use sensing data depending on a humidity circumstance.

With reference to FIG. 7, the controller 720, which senses an abnormal humidity phenomenon and controls suitable response thereto, controls a compensation process of the compensation unit 330 based on the sensed humidity ("sense humidity").

For example, the controller 720 controls execution of a compensation process by using sensing data when the sense humidity is less than the critical humidity, and controls execution of a compensation process by using reference data when the sense humidity is not less than the critical humidity.

When the sense humidity is not less than the critical humidity (the critical humidity regarded as the reference point for an abnormal humidity phenomenon), the controller 720 controls execution of a compensation process not by using the sensing data, but by using a previously set reference data and regarding the sensing data obtained from the current sensing driving as non-exact or false. Thus, a normal compensation can be performed.

Meanwhile, the compensation unit 330 performing a compensation process is included inside the timing controller 140, or in some cases, is included outside the timing controller 140.

The controller 720 is also included inside the timing controller 140, or in some cases, is included outside the timing controller 140.

With reference to FIGS. 7 and 8, a method of sensing of an abnormal humidity circumstance and responding to the case of sensing the abnormal humidity circumstance by using the organic light emitting display device 100 includes: a step S810 of performing a sensing operation for a threshold voltage or mobility; a step S820 of sensing humidity and determining whether the sense humidity is less than a previously set critical humidity; a step S830 of, when the sense humidity is less than the critical humidity, directly using a sensing data obtained in step S810 by regarding the humidity circumstance as a normal humidity circumstance; a step S840 of, when the sense humidity is not less than the critical humidity, not using the sensing data obtained in step S810 but using a previously set reference data "Ref. Data" by regarding the humidity circumstance as an abnormal humidity circumstance; and a step S850 of performing a compensation process by using the sensed data or the reference data "Ref. Data."

Further, when the sense humidity is not less than the critical humidity, the controller 720 judges that an abnormal humidity phenomenon exists, and performs a compensation process by not using a sensing data obtained by a sensing driving but using a previously set reference data. As a result, non-exact and/or false compensation can be prevented, and thus, an abnormal display phenomenon can be prevented.

However, although response action is taken to prevent the display abnormality phenomenon, when humidity is not less than the critical humidity, an overcurrent phenomenon, a burnt panel phenomenon, electronic component damage, or the like, occurring in the display panel 110 may not be prevented.

Therefore, to prevent a physical problem, such as an overcurrent phenomenon, a burnt panel phenomenon, or electronic component damage, a more positive response action may be needed.

In example embodiments, as a more positive response capable of preventing an overcurrent phenomenon, a burnt panel phenomenon, or an electronic component damage, it is possible to generate a flag signal instructing that there is a high possibility of generation of a physical problem such as the overcurrent phenomenon, the burnt panel phenomenon, or electronic component damage, to display an alarm message representing generation of the physical problem or a type thereof, or to execute a power off process finally.

However, although an abnormal humidity phenomenon is sensed, it may be a temporary phenomenon. Accordingly, when the abnormal humidity phenomenon is continuously sensed for a certain time or more, or is repeatedly sensed by a certain frequency or more, the above-mentioned positive response action may be taken.

Hereinafter, a time count method of determining the timing of a positive response action based on time will be described with reference to FIG. 9, and a frequency count method of determining the timing of a positive response action based on the frequency will be described with reference to FIG. 10.

Figure 9:
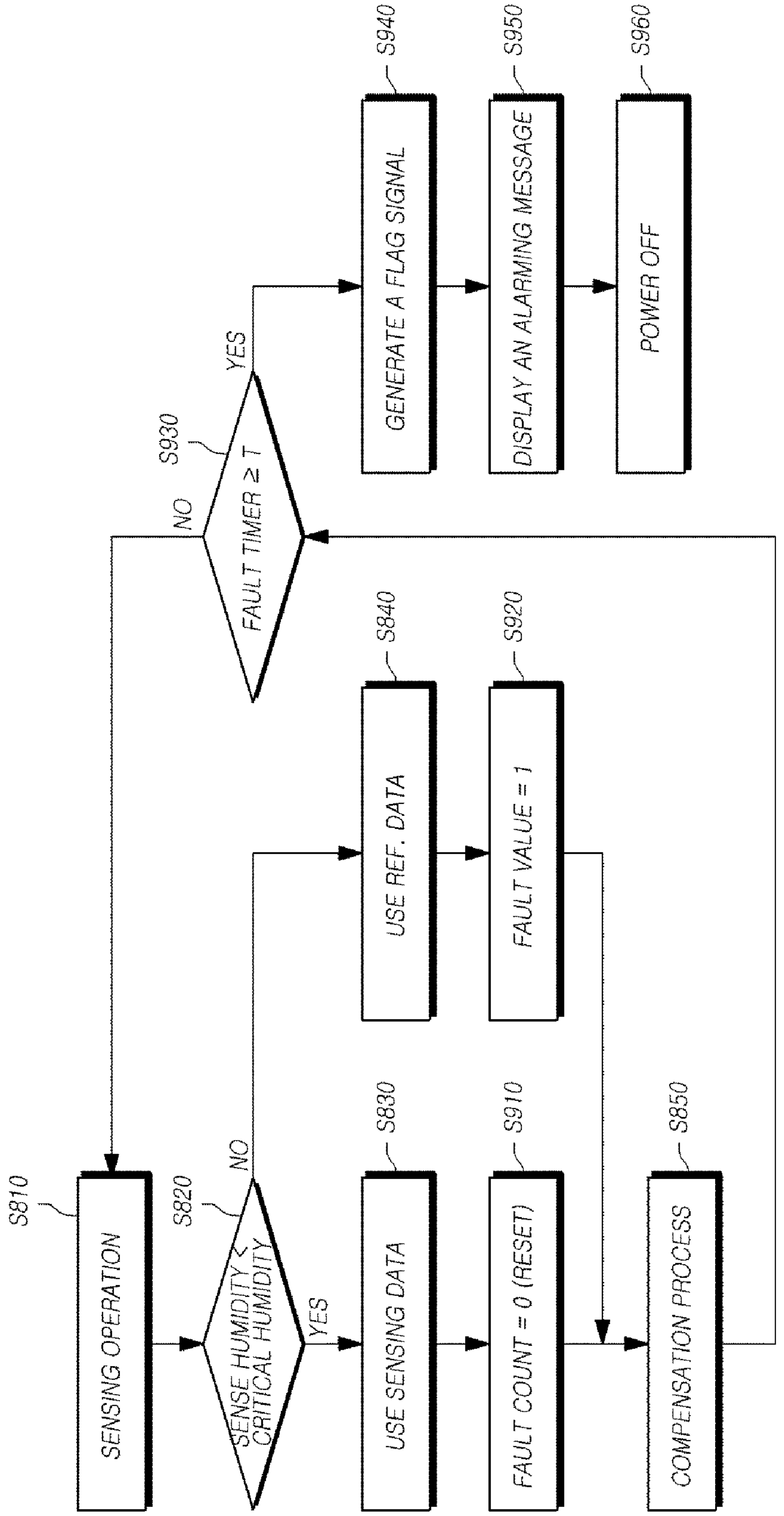
FIG. 9 is another flow chart of an abnormal humidity circumstance sensing and responding method of the organic light emitting display device according to an example of the embodiments.

FIG. 9 is another flow chart of an abnormal humidity circumstance sensing and responding method of the organic light emitting display device 100 according to an example of the embodiments. This flow chart illustrates a time count method, where determining a timing of taking a positive response action based on time is applied.

In this time count method, a Fault Value representing whether an abnormal humidity phenomenon is sensed is used. A Fault Value of 0 represents that the abnormal humidity phenomenon is not sensed, and a Fault Value of 1 represents that the abnormal humidity phenomenon is sensed.

Furthermore, in the time count method, a Fault Timer is used to count the duration time of the abnormal humidity phenomenon.

When the Fault Value is changed from 0 to 1, the Fault Timer starts an operation and counts the time. When the Fault Value is changed from 1 to 0, the Fault Timer stops the operation and initializes the counted time.

With reference to FIG. 9, in step S820, when judging that the sense humidity is less than the critical humidity, that is, the abnormal humidity phenomenon does not occur, the controller 720 maintains the value of the Fault Count of 0 or resets the Fault Count to 0 (S910).

With reference to FIG. 9, in step S820, when judging that the sense humidity is not less than the critical humidity, that is, the abnormal humidity phenomenon occurs, the controller 720 changes the value of the Fault Count to 1 or maintains the Fault Count (S920).

Meanwhile, in step S920, when the Fault Count is changed from 0 to 1, the Fault Timer starts an operation and counts time.

In step S920, when the Fault Count is maintained to be 1, the Fault Timer continues the operation and continuously counts time.

Then, the compensation unit 330 performs the compensation process by using the sensing data or the reference data, depending on the control of the controller 720 (S850).

Then, the controller 720 determines whether the Fault Timer is not less than a previously set certain time T (S930).

When it is determined that the Fault Timer is less than the certain time T, the controller 720 does not recognize that the abnormal humidity phenomenon lasts for a long enough time such that a positive response action is to be taken.

In contrast, when it is determined that the Fault Timer is not less than the certain time T, the controller 720 takes a positive response action.

For example, the controller 720 controls generation of a flag signal (S940) indicating, e.g., that there is a high possibility of generation of a physical problem such as an overcurrent phenomenon, a burnt panel phenomenon, electronic component damage (S940); displays an alarming message representing generation of the physical problem or a type thereof (S950); or executes a final, power off process (S960).

In example embodiments, the display of the alarming message and the power off process may be performed by the controller 720 or the timing controller 140, and may also be also performed by a main controller (not shown) of the organic light emitting display device 100.

According to the above-described time count method, when a condition that the sense humidity is not less than the critical humidity continues for a certain time, the controller 720 outputs a flag signal indicating the abnormal humidity circumstance, outputs a power off command signal, or outputs an alarming message display control signal.

Using the above-mentioned time count method, whether the abnormal humidity phenomenon is a temporary phenomenon or causes more serious problems is determined based on the duration time of the abnormal humidity phenomenon. When it is determined that a serious problem is caused, a positive response action, such as generation of a flag signal, display of an alarming message, or power off, is taken, and thus, physical problems such as the overcurrent phenomenon, the burnt panel phenomenon, or electronic component damage may be prevented.

Figure 10:
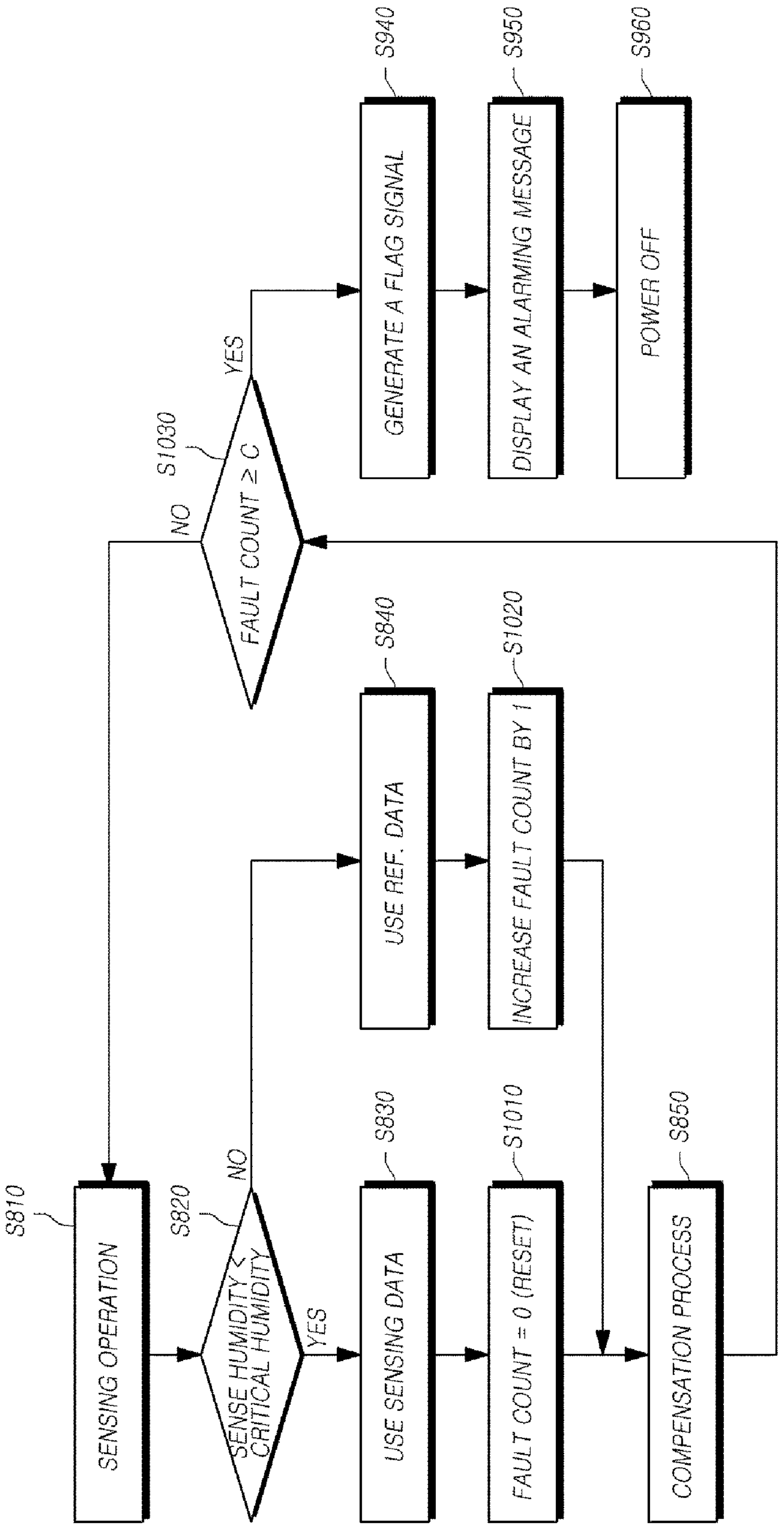
FIG. 10 is still another flow chart of an abnormal humidity circumstance sensing and responding method of the organic light emitting display device according to an example of the embodiments.

FIG. 10 is another flow chart illustrating an abnormal humidity circumstance sensing and responding method of the organic light emitting display device 100 according to an example of the embodiments.

FIG. 10 is a flow chart in which the frequency count method of determining a timing of taking a positive response action based on the frequency is applied.

In the frequency count method, a Fault Count representing the number of sensing the abnormal humidity phenomenon is used.

When the abnormal humidity phenomenon is not sensed, the Fault Count is 0, and the Fault Count increases by 1 every sensing of the abnormal humidity phenomenon.

With reference to FIG. 10, in step S820, when it is determined that the sense humidity is less than the critical humidity, that is, the abnormal humidity phenomenon does not occur, the controller 720 maintains the Fault Count at 0 or resets the Fault Count as 0 (S1010).

With reference to FIG. 10, in step S820, when judging that the sense humidity is not less than the critical humidity, that is, the abnormal humidity phenomenon occurs, the controller 720 increases the Fault Count by 1 (S1020).

Then, the compensation unit 330 performs the compensation process by using the sensing data or the reference data, depending on the control of the controller 720 (S850).

Then, the controller 720 determines whether the Fault Count is not less than a previously set certain frequency C (S1030).

When it is determined that the Fault Count is less than the certain frequency C, the controller 720 does not recognize that the abnormal humidity phenomenon lasts for a long time such that positive response action is to be taken.

In contrast, when it is determined that the Fault Count is not less than the certain frequency C, the controller 720 takes a positive response action. For example, the controller 720 controls generation of a flag signal indicating that there is a high possibility of generation of a physical problem such as an overcurrent phenomenon, a burnt panel phenomenon, electronic component damage (S940); displays an alarming message representing generation of the physical problem or a type thereof (S950); or executes a final, power off process (S960).

In example embodiments, the display of the alarming message and the power off process may be performed by the controller 720 or the timing controller 140, and may also be performed by a main controller (not shown) of the organic light emitting display device 100.

According to the above-described frequency count method, when a condition that the sense humidity is not less than the critical humidity continues for a certain time, the controller 720 outputs a flag signal instructing the abnormal humidity circumstance, outputs a power off command signal, or outputs an alarming message display control signal.

According to the above-described frequency count method, when a compensation process performed using the reference data is repeated for a certain frequency, the controller 720 outputs a flag signal instructing the abnormal humidity circumstance, outputs a power off command signal, or outputs an alarming message display control signal.

Using the above-mentioned frequency count method, whether the abnormal humidity phenomenon is a temporary phenomenon or causes more serious problems is determined based on a duration time of the abnormal humidity phenomenon. When it is determined that serious problems are caused, a positive response action such as generation of a flag signal, display of an alarming message, or power off is taken, and thus, the physical problems such as the overcurrent phenomenon, the burnt panel phenomenon, or electronic component damage may be prevented.

Hereinafter, an example of the implementing method, a position, and the like of the humidity sensor 710 is illustratively described. First, a configuration of the organic light emitting display device 100 is illustratively described.

Figure 11:
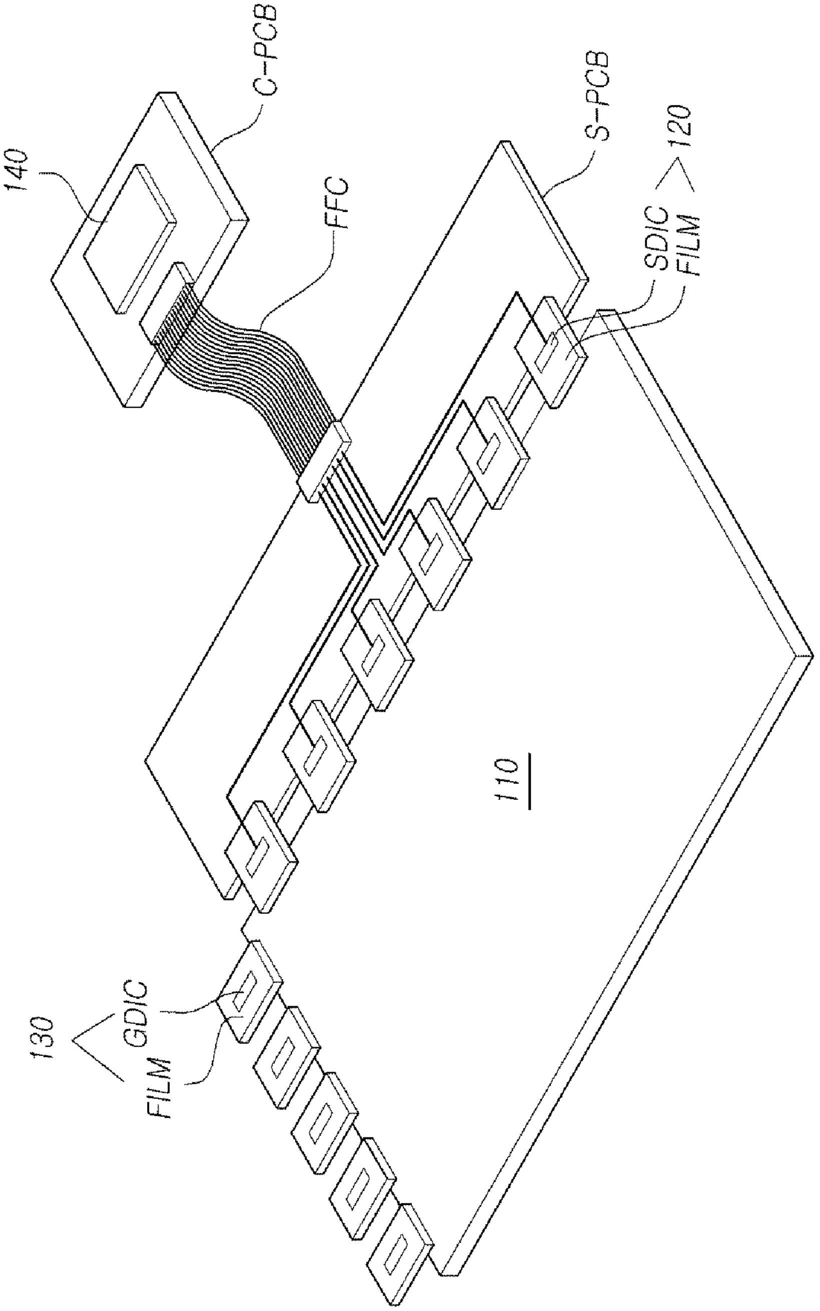
FIG. 11 is an example view illustrating implementation of the organic light emitting display device according to an example of the embodiments.

FIG. 11 is an example view illustrating an implementation of the organic light emitting display device 100 according to an example of the embodiments.

Each source driver integrated circuit SDIC included in the data driver 120 may be connected to a bonding pad of the display panel 110 by using a tape automated bonding TAB method or a chip on glass COG method, or be directly arranged in the display panel 110, or in some cases, be arranged in the display panel 110 in an integration state.

Further, as illustrated in FIG. 11, each source driver integrated circuit SDIC may be implemented by using a chip on film COF method that a chip is mounted on a film FILM connected to the display panel 110. In this example, the film is a flexible film in which circuits are printed.

Further, each gate driver integrated circuit GDIC included in the gate driver 130 may be connected to a bonding pad of the display panel 110 by using a tape automated bonding TAB method or a chip on glass COG method, or be directly arranged in the display panel 110 as a gate in panel GIP type, or in some cases, be arranged in the display panel 110 in an integration state.

As illustrated in FIG. 11, each gate driver integrated circuit GDIC may also be implemented by using a chip on film COF method that a chip is mounted on a film FILM connected to the display panel 110. In this example, the film is a flexible film in which circuits are printed.

With reference to FIG. 11, the organic light emitting display device 100 according to an example of the embodiments includes at least one source printed circuit board S-PCB needed to connect to at least source driver integrated circuit SDIC, a control printed circuit board C-PCB for embedding control elements such as the timing controller 140 and various electronic devices, and the like.

To at least one source printed circuit board S-PCB is connected at least one source driver integrated circuit SDIC, or a film in which at least one source driver integrated circuit SDIC is embedded.

In the control printed circuit board C-PCB are embedded the timing controller 140 that controls operations of the data driver 120, the gate driver 130, and the like, and a power controller that supplies various voltages or currents to be used in the organic light emitting display device 100 or controls various voltages or currents.

The source printed circuit board S-PCB may be connected to the control printed circuit board via a flexible flat cable FFC, or in some case, via a flexible printed circuit FPC.

At least one source printed circuit board S-PCB and control printed circuit board C-PCB may be implemented by being integrated as one printed circuit board.

Figure 12:
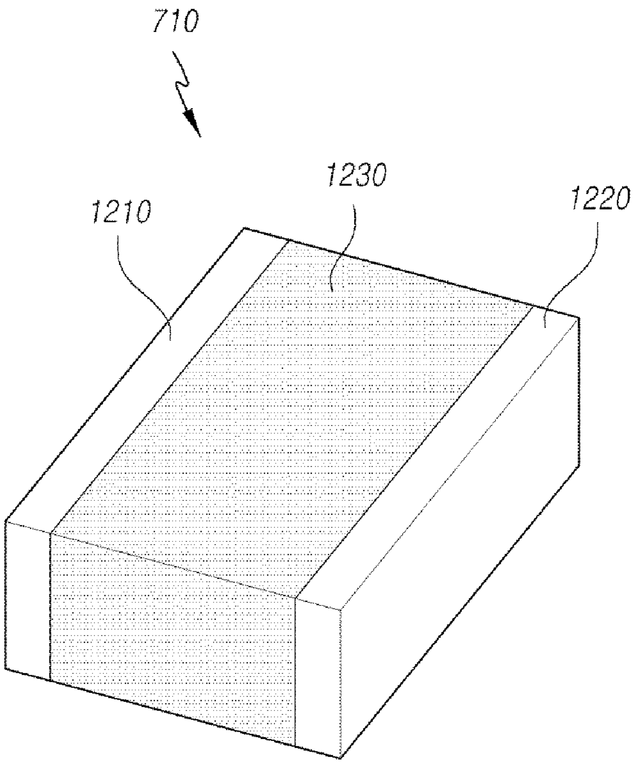
FIG. 12 is an example view illustrating a humidity sensor of the organic light emitting display device according to an example of the embodiments.

FIG. 12 is an example view illustrating a humidity sensor 710 of the organic light emitting display device 100 according to an example of the embodiments.

With reference to FIG. 12, in the organic light emitting display device 100 according to an example of the embodiments, the humidity sensor 710 is an analog humidity sensor configured by a first sensor electrode 1210, a dielectric 1230, and a second sensor electrode 1220. Here, the dielectric 1230 is a material reactive to humidity.

As described above, using the humidity sensor 710 having a type of analog humidity sensor, the phenomenon that electrodes, signal lines, and the like become short circuited, or the abnormal phenomenon that occurs in the display panel 110, can be traced. That is, the abnormal humidity phenomenon in the display panel 110 may be more exactly sensed.

Figure 13:
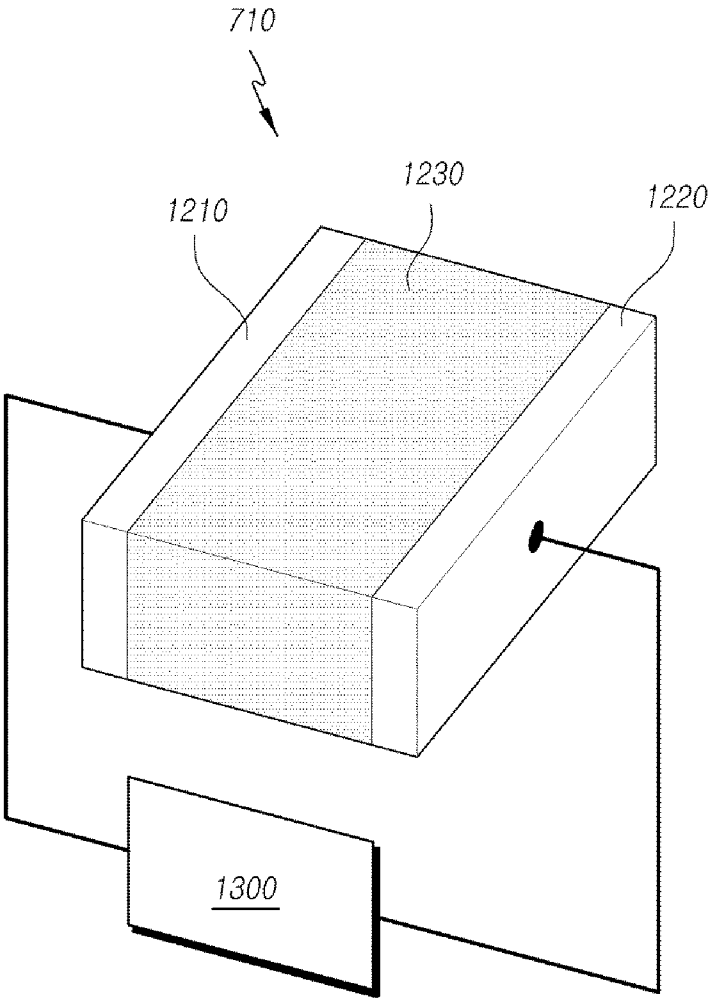
FIG. 13 is a diagram explaining a humidity sensing principle of the humidity sensor of FIG. 12.

FIG. 13 is a diagram explaining a humidity sensing principle of the humidity sensor 710 of FIG. 12. With reference to FIG. 13, the organic light emitting display device 100 further includes a humidity sensing unit 1300 as a substantial humidity sensing element.

The humidity sensing unit 1300 senses humidity on the basis of a resistance variation or a capacitance variance between the first sensor electrode 1210 and the second sensor electrode 1220 depending on neighboring (e.g., edge) humidity. This humidity sensing unit 1300 includes a circuit forming a voltage difference between the two sensor electrodes 1210 and 1220, a circuit measuring a potential difference between the two sensor electrodes 1210 and 1220 due to a humidity variance or voltages of the first sensor electrode 1210 and/or the second sensor electrode 1220, and the like.

Figure 14:
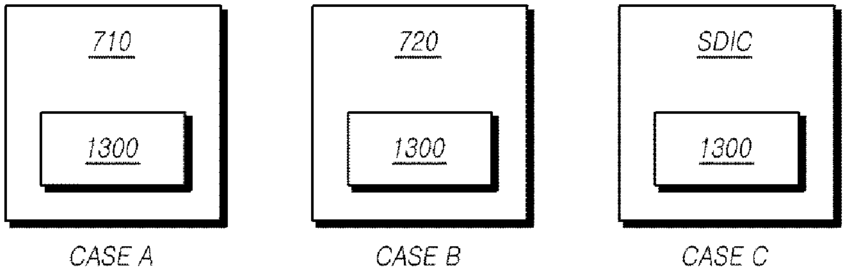
FIG. 14 is an example view illustrating an implementation position of a humidity sensing unit of FIG. 13.

FIG. 14 is an example view illustrating an implementation position of a humidity sensing unit 1300 of FIG. 13. With reference to FIG. 14, the humidity sensing unit 1300 of FIG. 13 may be implemented as various cases, such as the examples of A, B, and C.

The humidity sensing unit 1300 may be implemented as an independent circuit or as an independent electronic component. However, as shown by the example cases A, B, and C, illustrated in FIG. 14, the humidity sensing unit 1300 may be included in other devices as an internal element.

According to case A of FIG. 14, the humidity sensor 710 includes a humidity sensing unit 1300 sensing humidity on the basis of a resistance variation or a capacitance variance between the first sensor electrode 1210 and the second sensor electrode 1220 depending on neighboring humidity.

As described above, in the case of implementing the humidity sensor 710 including the humidity sensing unit 1300, together with the first sensor electrode 1210, the second sensor electrode 1220, and the dielectric 1230, there is an advantage that the humidity sensing configuration is easily installed in the organic light emitting display device 100.

According to case B of FIG. 14, a controller 720 includes the humidity sensing unit 1300 sensing humidity on the basis of a resistance variation or a capacitance variance between the first sensor electrode 1210 and the second sensor electrode 1220 depending on neighboring humidity.

Because the controller 720, which performs control on the basis of determination of an abnormal humidity phenomenon by using a humidity sensing result, includes the humidity sensing unit 1300, it may be possible to integrate and effectively perform sense of humidity, determination of the abnormal humidity phenomenon, and control in an abnormal humidity phenomenon occurrence.

According to case C of FIG. 14, the source driver integration circuit SDIC includes the humidity sensing unit 1300 sensing humidity on the basis of a resistance variation or a capacitance variance between the first sensor electrode 1210 and the second sensor electrode 1220 depending on neighboring humidity.

As described above, because the source driver integration circuit SDIC includes the humidity sensing unit 1300, when the humidity sensor 710 including the first sensor electrode 1210, the second electrode 1220, and the dielectric 1230 is positioned in the source printed circuit board S-PCB or a pad portion of the display panel 110, the humidity sensor 710 can be positioned to be closer to the humidity sensing unit 1300.

Figure 15:
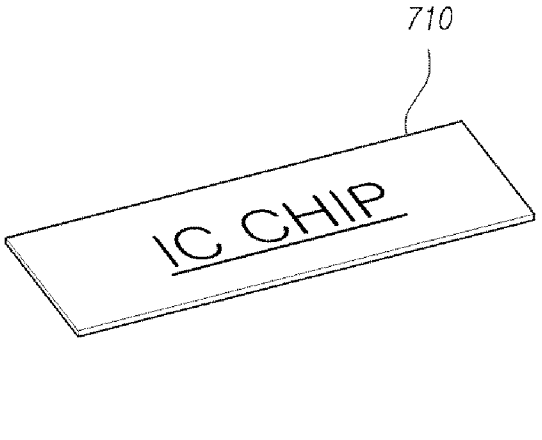
FIG. 15 is an example view illustrating another humidity sensor of the organic light emitting display device according to an example of the embodiments.

Meanwhile, as illustrated in FIG. 15, the humidity sensor 710 may be implemented as an integrated circuit (IC) chip.

Figure 16:
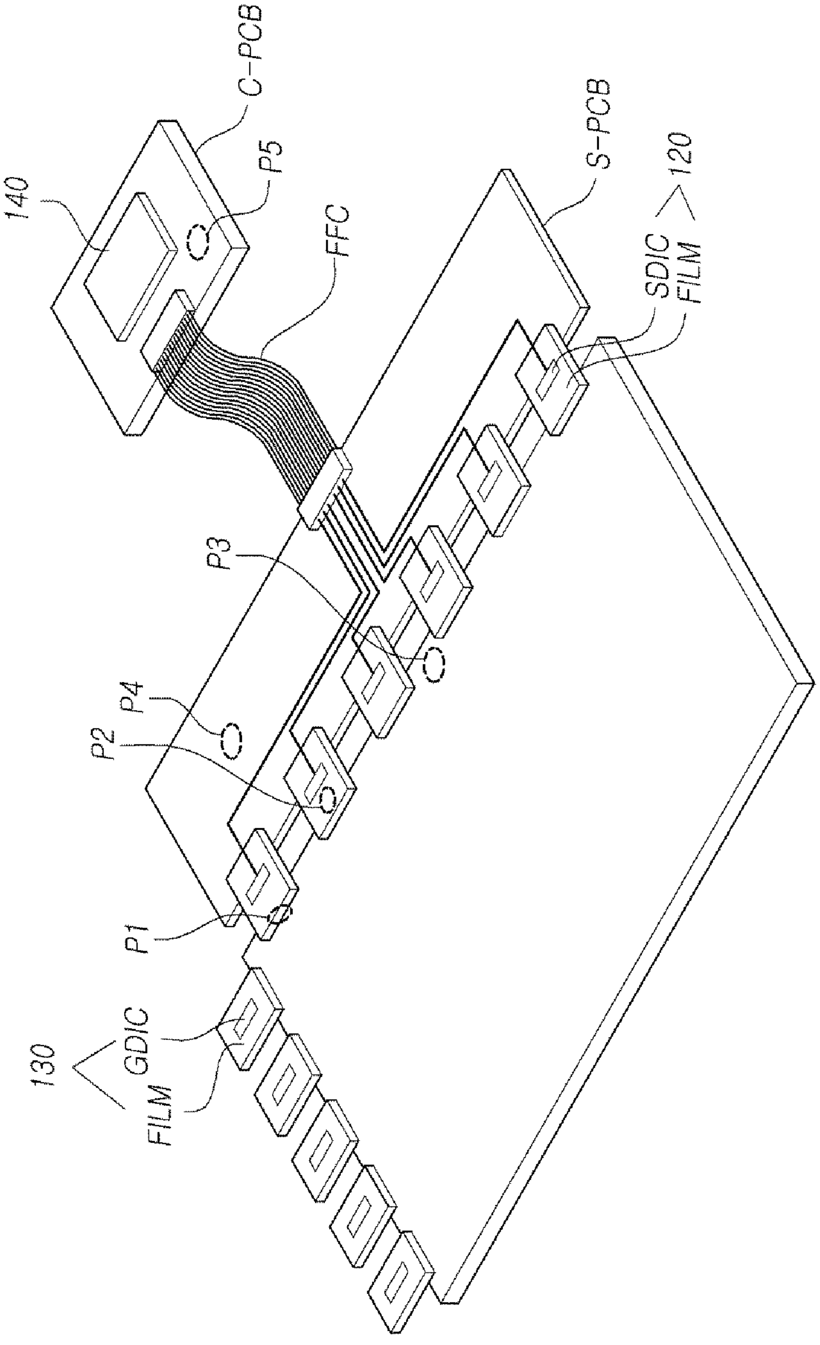
FIG. 16 is an example view illustrating an available position of a humidity sensor of the organic light emitting display device according to an example of the embodiments.

FIG. 16 is an example view illustrating an available position of a humidity sensor 710 of the organic light emitting display device 100 according to an example of the embodiments.

With reference to FIG. 16, the humidity sensor 710 is positioned in a pad P1 in which the display panel 110 and a film are connected to each other, on an area P2 of a film which is connected to the display panel 110, in a neighboring (e.g., edge) area P3 of the display panel 110, or in areas P4 and P5 of printed circuit boards.

Therefore, the humidity sensor 710 is positioned in an area suitable for the configuration of the organic light emitting display device 100.

Figure 17:
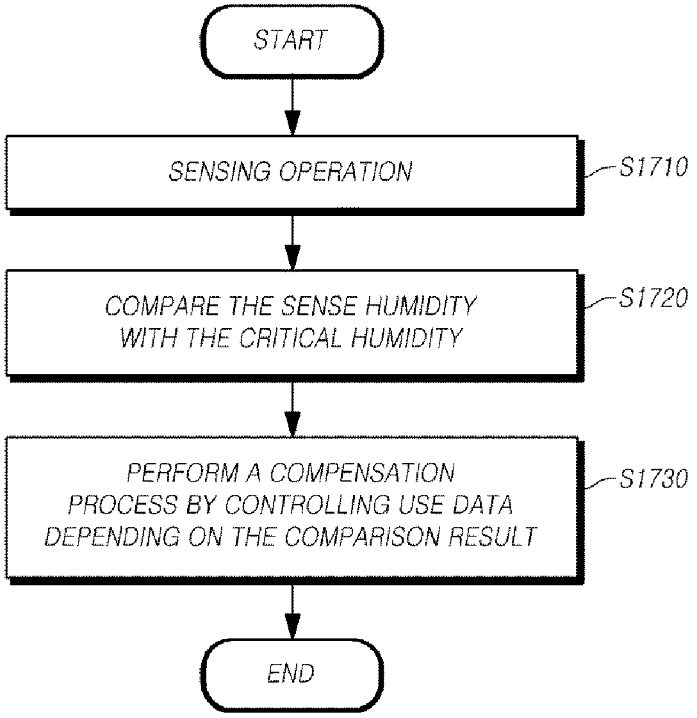
FIG. 17 is a flow chart illustrating a driving method of the organic light emitting display device according to an example of the embodiments.

FIG. 17 is a flow chart illustrating a driving method of the organic light emitting display device 100 according to an example of the embodiments. With regard to sense of an abnormal humidity phenomenon and a response action thereto as described above, explanation is repeated.

With reference to FIG. 17, a driving method of the organic light emitting display device 100 according to an example of the embodiments includes a step S1710 of generating a sensing data for feature values of an organic light emitting diode OLED or a driving transistor DRT of each sub-pixel SP; a step S1720 of comparing sense humidity sensed by using the humidity sensor 710 in the organic light emitting display device 100 with a previously set critical humidity, and a step S1730 of determining whether to use the sensing data in a compensation process depending on the comparison result of the step S1720 and performing a compensation process using the sensing data or a compensation process using a previously stored reference data, depending on the determination result.

Using the driving method described above, a display abnormal phenomenon caused by an abnormal humidity circumstance can be previously prevented by performing a normal compensation after determining whether to use a sensing data or not, depending on a humidity circumstance.

The above-mentioned controller 720 may be implemented as an independent electronic component or may be included in the timing controller 140.

Hereinafter, the timing controller 140 including the controller 720 is described.

Figure 18:
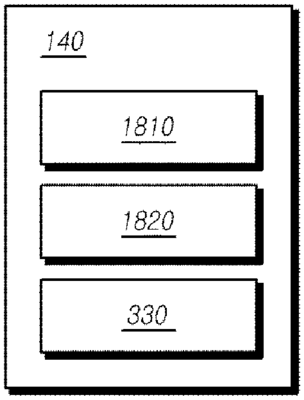
FIG. 18 is a block diagram illustrating a timing controller of the organic light emitting display device according to an example of the embodiments.

FIG. 18 is a block diagram illustrating the timing controller 140 of the organic light emitting display device 100 according to an example of the embodiments. With reference to FIG. 18, the timing controller 140 of the organic light emitting display device 100 includes a sensing data receiving unit 1810 that receives a sensing data for feature values of an organic light emitting diode OLED or a driving transistor DRT of each sub-pixel SP; a comparing unit 1820 that compares sense humidity sensed by using the humidity sensor 710 with a previously set critical humidity; and a compensation unit 330 that performs a compensation process using the sensing data or a compensation process using a previously stored reference data depending on the comparison result.

As described above, there is provided a timing controller 140 in which a display abnormal phenomenon caused by an abnormal humidity circumstance may be previously prevented by performing a normal compensation after determining whether to use a sensing data or not, depending on a humidity circumstance.

The display panel 110 in which the humidity sensor 710 is positioned is described below.

Figure 19:
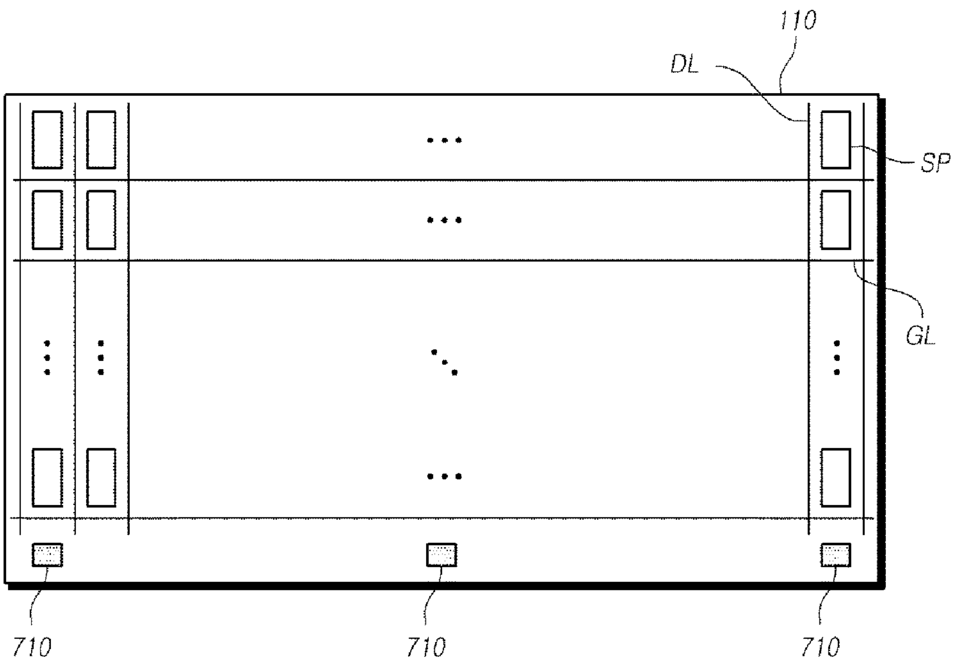
FIG. 19 is an example view illustrating a display panel according to an example of the embodiments.

FIG. 19 is an example view illustrating the display panel 110 according to the embodiments. With reference to FIG. 19, the display panel 110 includes plural data lines DL arranged in a first direction, plural gate lines GL arranged in a second direction, plural sub-pixels SP arranged in a matrix, and at least one humidity sensor 710 that is configured by a first sensor electrode 1210, a dielectric 1230, and a second sensor electrode 1220 arranged in the neighboring (e.g., edge) area and that senses humidity on the basis of resistance variance or capacitance variance between the first sensor electrode 1210 and the second sensor electrode 1220, and the like.

As described with reference to FIG. 16, the at least one humidity sensor 710 may be positioned in various areas (for example, a pad area, an outside area, or the like).

The display panel 110 of FIG. 19 may be an organic light emitting display panel as described above, but may also be a liquid crystal display panel. Thus, as described above, the display panel 110 capable of sensing humidity is provided.

According to the example embodiments described above, there is provided the timing controller 140, the display panel 110, the organic light emitting display device 100, and the driving method thereof, in which a display abnormal phenomenon depending on humidity, such as a line defect, can be prevented.

According to the example embodiments, there is also provided the timing controller 140, the display panel 110, the organic light emitting display device 100, and the driving method thereof, in which improper compensation caused by generation of a non-exact or false sensing data due to humidity can be avoided.

According to the example embodiments, there is also provided the timing controller 140, the display panel 110, the organic light emitting display device 100, and the driving method thereof, in which an overcurrent phenomenon or a burnt panel phenomenon due to humidity can be avoided.

It will be apparent to those skilled in the art that various modifications and variations can be made in embodiments of the present invention without departing from the spirit or scope of the invention. Thus, it is intended that the present invention cover the modifications and variations of this invention provided they come within the scope of the appended claims and their equivalents.

What is claimed is:

1. An organic light emitting display device, comprising:

a display panel including a plurality of sub-pixels, each sub-pixel having an organic light emitting diode and a driving transistor to drive the organic light emitting diode;

a memory that stores reference data;

a sensing circuit configured to sense, from each sub-pixel, a feature value of the organic light emitting diode or the driving transistor of each sub-pixel, and to output sensing data for the feature value;

a humidity sensor configured to sense humidity; and a controller configured to:

compare sense humidity sensed by the humidity sensor with a predetermined critical humidity to obtain a comparison result, and control compensation for variance of the feature value using the sensing data or the reference data, depending on the comparison result, such that:

the controller controls execution of the compensation by using the sensing data from the sensing circuit when the sense humidity is less than the critical humidity, and controls execution of the compensation by using the reference data when the sense humidity is not less than the critical humidity.

2. The organic light emitting display device according to claim 1, wherein:

the controller outputs a flag signal indicating an abnormal humidity circumstance, outputs a power off command signal, or outputs an alarming message display control signal when a condition that the sense humidity is not less than the critical humidity continues for a certain time.

3. The organic light emitting display device according to claim 1, wherein:

the controller outputs a flag signal indicating an abnormal humidity circumstance, outputs a power off command signal, or outputs an alarming message display control signal when a condition that a compensation process is performed by using the reference data is repeated with a certain frequency.

4. The organic light emitting display device according to claim 1, wherein:

the humidity sensor is an analog humidity sensor including a first sensor electrode, a dielectric, and a second sensor electrode.

5. The organic light emitting display device according to claim 4, wherein:

the humidity sensor further includes a humidity sensing circuit configured to sense humidity on the basis of a resistance variation or a capacitance variance between the first sensor electrode and the second sensor electrode.

6. The organic light emitting display device according to claim 4, wherein:

the controller includes a humidity sensing circuit configured to sense humidity on the basis of a resistance variation or a capacitance variance between the first sensor electrode and the second sensor electrode.

7. The organic light emitting display device according to claim 4, further comprising:

a source driver integrated circuit for driving a data line arranged in the display panel, the source driver integrated circuit including a humidity sensing circuit configured to sense humidity on the basis of a resistance variation or a capacitance variance between the first sensor electrode and the second sensor electrode.

8. The organic light emitting display device according to claim 1, wherein:

the humidity sensor is positioned in an edge area of the display panel, on a film connected to the display panel, on a printed circuit board, or in a pad area in which the display panel and the film are connected to each other.

9. The organic light emitting display device according to claim 1, wherein:

the display panel further comprises a plurality of data lines in a first direction and a plurality of gate lines in a second direction;

the plurality of sub-pixels are in the form of a matrix and are defined by the intersections of the data lines and the gate lines; and the humidity sensor includes a first sensor electrode, a dielectric, and a second sensor electrode, the humidity sensor configured to sense humidity based on resistance variation or capacitance variation between the first sensor electrode and the second sensor electrode.

10. The organic light emitting display device according to claim 1, wherein the feature value includes at least one of a threshold voltage of the organic light emitting diode, a threshold voltage of the driving transistor, and a mobility of the driving transistor.

11. The organic light emitting display device according to claim 1, wherein the controller controls compensation using the sensing data by:

calculating a compensation value based on the sensing data; and changing image data for the sub-pixel associated with the respective feature value using the calculated compensation value.

12. A method of driving an organic light emitting display device including a display panel including a plurality of sub-pixels, each sub-pixel having an organic light emitting diode and a driving transistor to drive the organic light emitting diode, the method comprising:

sensing, from each sub-pixel, a feature value of the organic light emitting diode or the driving transistor of each sub-pixel;

generating sensing data for the feature value;

sensing humidity by a humidity sensor included in the display device;

comparing sense humidity sensed by the humidity sensor with a predetermined critical humidity; and determining whether to use the sensing data in compensation for variance of the feature value depending on a result of the comparing, wherein:

the determining step determines that the compensation is performed by using the sensing data generated for the feature value when the sense humidity is less than the critical humidity, and determines that the compensation is performed by using reference data when the sense humidity is not less than the critical humidity.

13. The method according to claim 12, wherein the compensation is performed using the sensing data by:

calculating a compensation value based on the sensing data; and changing image data for the sub-pixel associated with the respective feature value using the calculated compensation value.

14. A timing controller, comprising:

a sensing data receiving circuit configured to receive sensing data for a feature value of an organic light emitting diode or a driving transistor for each of a plurality of sub-pixels, the feature value sensed from each sub-pixel;

a comparator configured to compare sense humidity sensed by a humidity sensor with a predetermined critical humidity to obtain a comparison result; and a compensation circuit configured to perform compensation for variance of the feature value using the sensing data or reference data, depending on the comparison result, such that:

the compensation circuit performs the compensation by using the sensing data received by the sensing data receiving circuit when the sense humidity is less than the critical humidity, and performs a compensation process by using the reference data when the sense humidity is not less than the critical humidity.

15. The timing controller according to claim 14, wherein the compensation circuit performs the compensation using the sensing data by:

calculating a compensation value based on the sensing data; and changing image data for the sub-pixel associated with the respective feature value using the calculated compensation value.

* * * * *